United States Patent
White

(10) Patent No.: US 7,702,691 B2
(45) Date of Patent: Apr. 20, 2010

(54) SYSTEMS AND METHODS FOR EJB FINDERS USING SQL

(75) Inventor: Seth White, San Francisco, CA (US)

(73) Assignee: BEA Systems, Inc., Redwood Shores, CA (US)

(*) Notice: Subject to any disclaimer, the term of this patent is extended or adjusted under 35 U.S.C. 154(b) by 448 days.

(21) Appl. No.: 10/965,529

(22) Filed: Oct. 14, 2004

(65) Prior Publication Data
US 2005/0262135 A1   Nov. 24, 2005

Related U.S. Application Data

(60) Provisional application No. 60/573,309, filed on May 21, 2004.

(51) Int. Cl.
*G06F 7/00* (2006.01)
(52) U.S. Cl. .................. 707/781; 719/329
(58) Field of Classification Search .......... 707/10, 707/100; 717/118
See application file for complete search history.

(56) References Cited

U.S. PATENT DOCUMENTS

| | | | |
|---|---|---|---|
| 6,996,565 B2* | 2/2006 | Skufca et al. | 707/10 |
| 2003/0028551 A1* | 2/2003 | Sutherland | 707/200 |
| 2003/0220893 A1* | 11/2003 | Dettinger et al. | 707/1 |
| 2004/0098359 A1* | 5/2004 | Bayliss et al. | 707/1 |
| 2004/0215604 A1* | 10/2004 | Ivanov | 707/3 |
| 2005/0055449 A1* | 3/2005 | Rappold, III | 709/228 |
| 2005/0114310 A1* | 5/2005 | Long | 707/3 |
| 2005/0114835 A1* | 5/2005 | Francis et al. | 717/118 |
| 2005/0138041 A1* | 6/2005 | Alcorn et al. | 707/100 |

* cited by examiner

*Primary Examiner*—Tim T. Vo
*Assistant Examiner*—Jau-Shya Meng
(74) *Attorney, Agent, or Firm*—Fliesler Meyer LLP

(57) ABSTRACT

A system and method to support querying of a software object comprises a software object finder that can query a plurality of different databases using a plurality of queries in different query language. A matched data entity from the plurality of databases is mapped into one or more instances of the software object stored in a result set. The system also supports pre-fetching of related software objects of a software object from different databases into a cache using queries in different query languages.

31 Claims, 8 Drawing Sheets

```
<ejb-jar>
...
  <enterprise-beans>
  ...
    <entity>
      <ejb-name>OrderEJB</ejb-name>
      ...
      <query>                                                    ⎫
        <description>                                             |
            Find all orders placed on a particular Date. The ejb-ql |
            element is left blank to signify that the query is not |
            implemented using ejb-ql, per the EJB spec.           |
        </description>                                            |
        <query-method>                                            ⎬ 301
          <method-name>findOrdersByDate</method-name>             |
          <method-params>                                         |
            <method-param>java.sql.Date</method-param>            |
          </method-params>                                        |
        </query-method>                                           |
        <ejb-ql></ejb-ql>    303                                  |
      </query>                                                    ⎭

<query>                                                    ⎫
        <description>                                             |
            Find all orders placed on a particular Date. The ejb-ql |
            element is left blank to signify that the query is not |
            implemented using ejb-ql, per the EJB spec.           |
        </description>                                            |
        <query-method>                                            ⎬ 302
          <method-name>findOrdersByStatus</method-name>           |
          <method-params>                                         |
            <method-param>java.lang.String</method-param>         |
          </method-params>                                        |
        </query-method>                                           |
        <ejb-ql></ejb-ql>    304                                  |
      </query>                                                    ⎭
  ...
<ejb-jar>
```

Figure 3 (a)

```xml
<weblogic-rdbms-jar>
...
  <weblogic-rdbms-bean>
  ...
    <sql-caching>
      <description>Select all columns from the Order table and related columns from the LineItem table.
      </description>
      <sql-caching-name>Order-LineItem</sql-caching-name>
      <ejb>
        <ejb-name>OrderEJB</ejb-name>
        <table>
          <table-name>orders</table-name>
          <dbms-column>id</dbms-column>
          <dbms-column>date</dbms-column>
          <dbms-column>status</dbms-column>
        </table>
        <sql-caching-element>
          <cmr-field>lineItems</cmr-field>
          <table>
            <table-name>lineitems</table-name>
            <dbms-column>order_number</dbms-column>
            <dbms-column>product_id</dbms-column>
            <dbms-column>quantity</dbms-column>
          </table>
        </sql-caching-element>
      <ejb>
    </sql-caching>

<weblogic-query>
      <query-method>
        <method-name>findOrdersByDate</method-name>
        <method-params>
          <method-param>java.sql.Date</method-param>
        </method-params>
      </query-method>
      <sql-descriptor>
        <sql-caching-name>Order-LineItem</sql-caching-name>
        <database-type>Default</database-type>
        <sql>
          SELECT o.id, o.date, o.status, l.order_number,
              l.product_id, l.quantity
          FROM Order o LEFT OUTER JOIN LineItem l ON o.id=l.orderNumber
          WHERE o.date=?1
        </sql>
        <database-type>Oracle</database-type>
        <sql>
          SELECT o.id, o.date, o.status, l.order_number,
              l.product_id, l.quantity
          FROM orders o, lineitems l
          WHERE o.id(+)=l.orderNumber and o.date=?1
        </sql>
      </sql-descriptor>
    </weblogic-query>
    ...
  <weblogic-rdbms-bean>
  ...
<weblogic-rdbms-jar>
```

- 401 (covers the sql-caching element block)
- 402 (Default database-type SQL block)
- 403 (Oracle database-type SQL block)

Figure 4

```
<weblogic-rdbms-jar>
...
  <weblogic-rdbms-bean>
  ...
    <sql-caching>
      <description>Select all columns from the Order table using a stored
          procedure.  The scenario uses the standard JDBC escape syntax.
      </description>
      <sql-caching-name>Order-All</sql-caching-name>
      <ejb>
        <ejb-name>OrderEJB</ejb-name>
        <table>
          <table-name>orders</table-name>
          <dbms-column>id</dbms-column>
          <dbms-column>date</dbms-column>
          <dbms-column>status</dbms-column>
        </table>
      </ejb>
    </sql-caching>

<weblogic-query>
      <query-method>
        <method-name>findOrdersByDate</method-name>
        <method-params>
          <method-param>java.sql.Date</method-param>
        </method-params>
      </query-method>
      <sql-descriptor>
        <sql-caching-name>Order-All</sql-caching-name>      501
        <sql>{? = call order_by_date(?1)}</sql>
      </sql-descriptor>
    </weblogic-query>
  <weblogic-rdbms-bean>
...
<weblogic-rdbms-jar>
```

Figure 5

```
<ejb-jar>
...
  <enterprise-beans>
  ...
    <entity>
      <ejb-name>OrderEJB</ejb-name>
      ...
    <query>
      <description>
        Select all orders and their total when the total is larger than
        a specified amount. Order the result by total largest to smallest.
        The EJB QL would be something like this, (but our container doesn't
        support all of the features used in this query today):
            SELECT OBJECT( o), SUM(l.cost) AS c
            FROM OrderEJB o, IN(o.lineItems) l
            GROUP BY  o
            HAVING c > ?1
            ORDER BY c DESC
      </description>
      <query-method>
        <method-name>selectOrderAndOrderTotal</method-name>
        <method-params>
          <method-param>double</method-param>
        </method-params>
      </query-method>
      <ejb-ql></ejb-ql>
    </query>
...
<ejb-jar>
```

Figure 6 (a)

SYSTEMS AND METHODS FOR EJB FINDERS USING SQL

CLAIM OF PRIORITY

This application claims priority from the following application, which is hereby incorporated by reference in its entirety:

U.S. Provisional Patent Application No. 60/573,309, entitled SYSTEM AND METHOD FOR EJB FINDERS USING SQL by Seth White, filed May 21, 2004.

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

FIELD OF THE INVENTION

This invention relates to the field of querying database and mapping data to EJB.

BACKGROUND

A server-side application component can be utilized to encapsulate the business logic of an application. Here the server-side application component can be an instance of a programmable class (also referred to as class), which can be but is not limited to, a Java® bean, an Enterprise Java® Bean (EJB), an interface, a module, and other suitable concepts, and EJB will be used to illustrate the various embodiments of the invention in the following context. The instances of an EJB are created and managed at runtime by a container, which runs as part of an application server to provide enterprise applications with a high level of abstraction. An EJB can be customized at deployment time via a deployment descriptor, which allows the editing of both the structural and application assembly information about the EJB. An important type of EJB is the entity bean, which is a component that represents an object-oriented view of some entities stored in a persistent storage, such as a database, or entities that are implemented by an existing enterprise application. An EJB query component, such as an EJB Finder, can be deployed in the EJB to query a database using a query language, map and/or hydrate the matched data entities in the database to one or more EJB instances, and store them in a result set, which allows fast and easy access to the EJB instances. Here, the database can be a relational database, an Oracle Database, a MS SQL server, a DB2, and other suitable concepts.

EJB-QL was introduced as a standard query language to implement an EJB Finder. The chief advantage of EJB-QL is that it is a high-level, object query language that allows queries to be specified against an EJB object without requiring any knowledge of the underlying types of the databases or their Database Management Systems (DBMS). This makes the EJB Finder and EJB applications portable across different database products.

Since its introduction, however, EJB-QL has been proven to have the following disadvantages:

EJB-QL is not as expressive as SQL. EJB-QL represents a least common denominator that does not capture all of the features that different vendors have added to their databases over the years. For example, certain SQL queries cannot be expressed using EJB-QL. This often forces users to abandon EJB-QL or deters them from using it to begin with.

EJB-QL is different from SQL. While this is its main advantage as stated above, it is also a disadvantage because it requires EJB developers to learn a new query language. It will be difficult for developers to master multiple query languages efficiently, such as SQL, EJB-QL, etc.

BRIEF DESCRIPTION OF THE DRAWINGS

FIG. 4 is an exemplary code illustrating one scenario of implementing an EJB Finder using SQL in accordance with one embodiment of the present invention.

FIG. 5 is an exemplary code illustrating one scenario of implementing an EJB Finder using SQL in accordance with one embodiment of the present invention.

DETAILED DESCRIPTION

The invention is illustrated by way of example and not by way of limitation in the figures of the accompanying drawings in which like references indicate similar elements. It should be noted that references to "an" or "one" embodiment in this disclosure are not necessarily to the same embodiment, and such references mean at least one.

Embodiments of the present invention overcome the disadvantages listed above by allowing EJB Finders in an EJB to be implemented using SQL in addition to EJB-QL to query an underling database and map the matched data instances to instances of the EJB. This will enable developers to use the full querying power of their chosen DBMS and will remove the requirement that they learn a new query language. The EJB Finder can be invoked by Java® code, and its features can be specified by the EJB's deployment descriptor(s) in XML format and/or using Java® annotations. The SQL queries can be executed against multiple types of databases. Since EJB-QL is a popular high-level object query language that many developers will continue to use, they may continue to use EJB-QL for the majority of their EJB queries. They may drop into SQL when they need to, or use SQL if they simply refuse to learn EJB-QL.

An EJB Finder implemented using SQL shares common features with an EJB Finder implemented using EJB-QL, such features may include but are not limited to the following:

The cache will be flushed as usual before executing a finder that specifies to include cache updates.

Only the number of elements specified by the max elements for a finder will be returned.

There are no restrictions on the concurrency type that may be used with a finder.

A finder does not affect the way that updates, inserts, and removes are handled.

A finder, either dynamic or static, will work with query caching.

Figure 1:
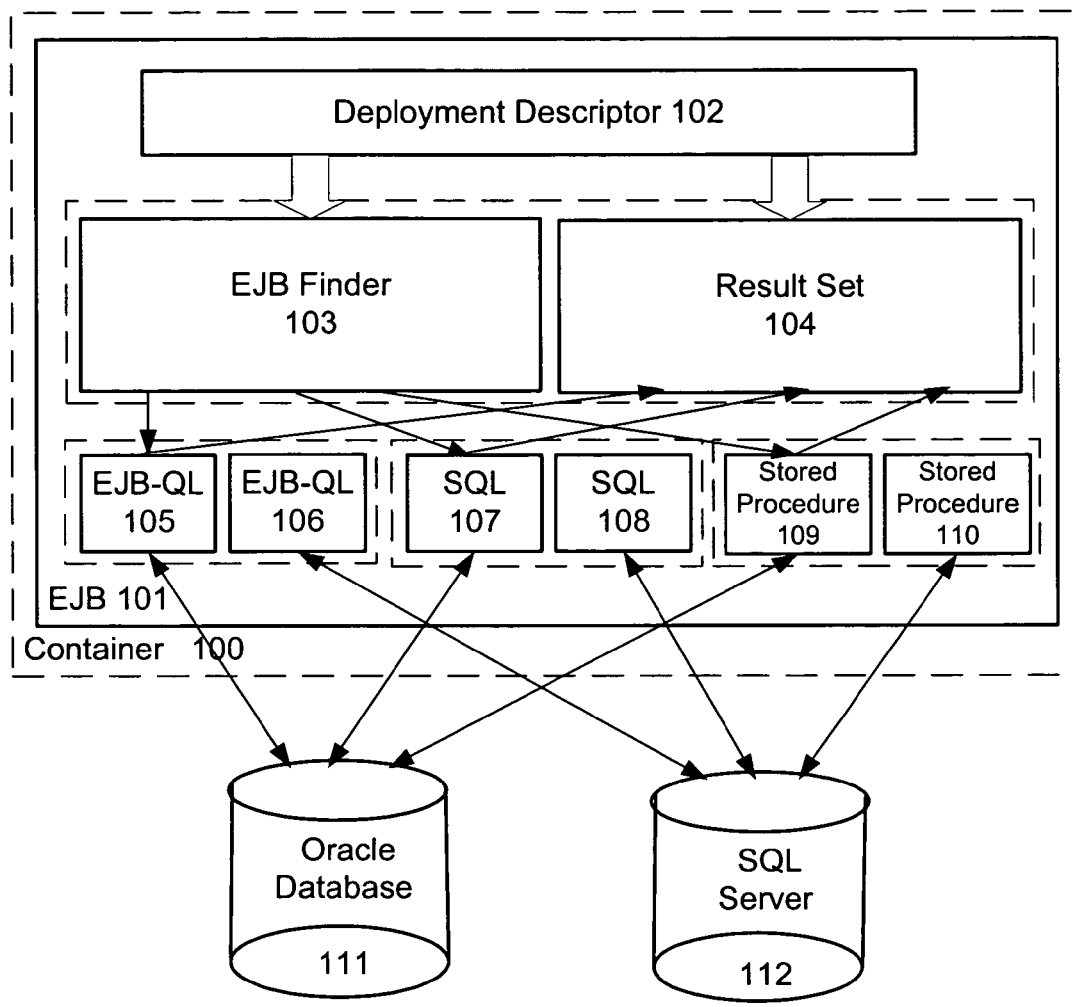
FIG. 1 is an illustration of an exemplary EJB Finder implemented in accordance with one embodiment of the present invention.

FIG. 1 is an illustration of an EJB Finder implemented in accordance with one embodiment of the present invention. Although this diagram depicts components as functionally separate, such depiction is merely for illustrative purposes. It will be apparent to those skilled in the art that the components portrayed in this figure can be arbitrarily combined or divided into separate software, firmware and/or hardware components. Furthermore, it will also be apparent to those skilled in the art that such components, regardless of how they are combined or divided, can execute on the same computing device or multiple computing devices, and wherein the multiple computing devices can be connected by one or more networks.

Referring to FIG. 1, an EJB Finder 103 is capable of querying an underling database 111 and 112, mapping the matched data entities against an EJB 101 in a container 100, and saving the generated EJB instances in a result set 104. A deployment descriptor 102 defines various features in the EJB Finder, such as the query languages used by the finder, the underlying databases to be queried against, the query selection information (query statement). It also defines how the matched data entities should be mapped to EJB instances in the result set, as well as which columns in the data entities should be skipped from mapping. The EJB Finder can invoke statements of multiple query languages, whose types can include but are not limited to, EJB-QL 105 and 106, SQL 107 and 108, stored procedures 109 and 110. Each statement of these query languages can be applied to a specific type of database, such as an Oracle Database 111 or an SQL Server 112.

Figure 2:
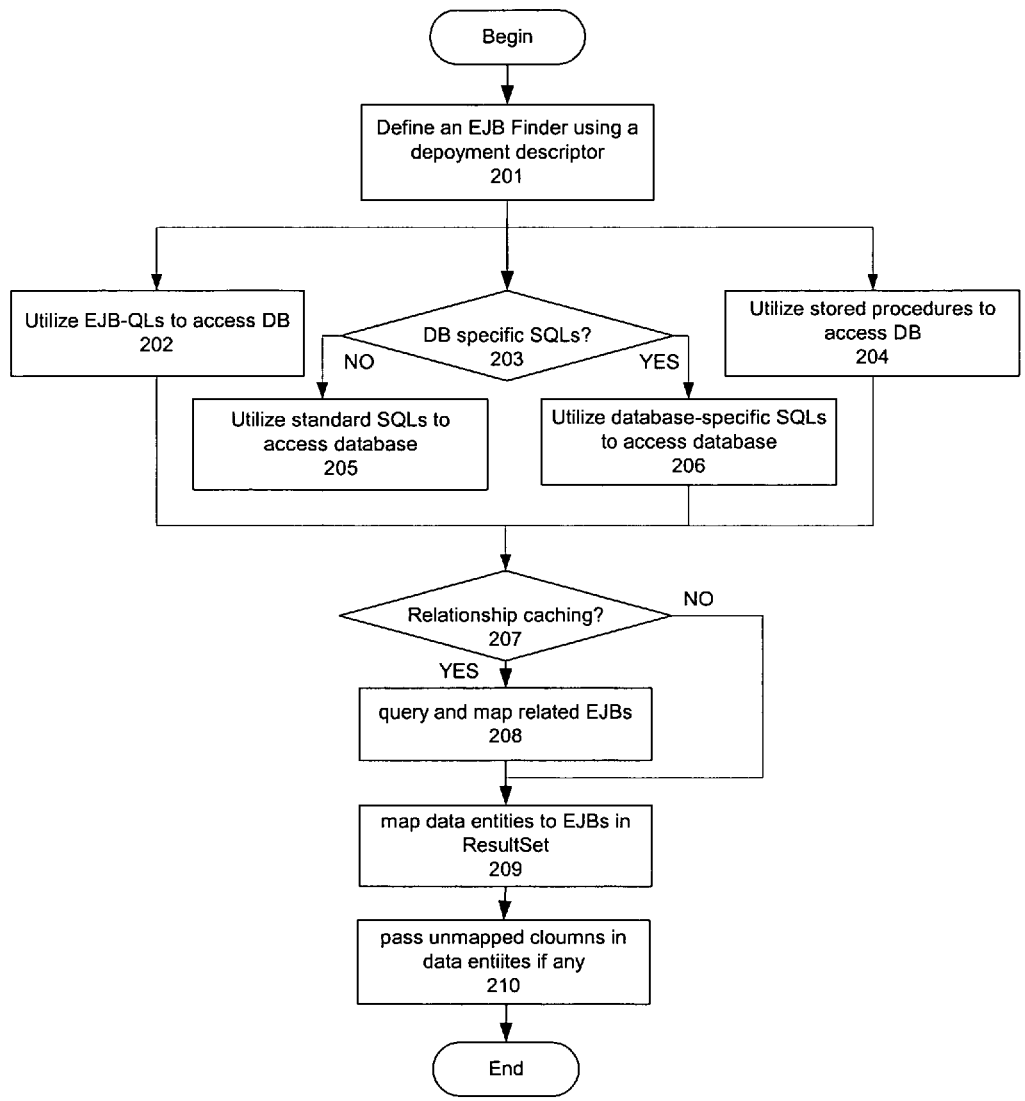
FIG. 2 is a flow chart illustrating an exemplary database querying process in accordance with one embodiment of the present invention.

FIG. 2 is a flow chart of an exemplary database querying process in accordance with one embodiment of the invention. Although this figure depicts functional steps in a particular order for purposes of illustration, the process is not limited to any particular order or arrangement of steps. One skilled in the art will appreciate that the various steps portrayed in this figure could be omitted, rearranged, combined and/or adapted in various ways.

Referring to FIG. 2, step 201 defines features of an EJB Finder using specification in a deployment descriptor. The EJB Finder can then utilize EJB-QLs, SQLs or stored procedures to access the underling database at step 202, 203 and 204, respectively. In case where an SQL is used, step 203 will check if the SQL is database specific. If so, step 206 will use database-specific SQLs to access the database; otherwise, step 205 will use standard SQLs to access the database. Step 209 maps the matched data entities to EJB instances and saves them in the result set. Step 210 will pass along any columns in the data entities that are not mapped to the EJB instances. In case of relationship caching checked at step 207, related EJBs will also be queried and mapped at step 208.

In one embodiment, an EJB Finder implemented using SQL supports relationship caching (also referred to as "prefetching of related EJBs"), i.e., queries that cache multiple related EJBs of the current EJB of interest, which improves the performance of entity beans by loading related bean instances into the cache and avoiding multiple queries by issuing a join query for the related bean.

In one embodiment, an EJB Finder implemented using SQL supports the use of stored procedures, which are functional components previously generated and stored on the server. Mapping information can be associated with individual stored procedures that return a result set.

In one embodiment, an EJB Finder implemented using SQL supports the deployment against multiple types of databases by allowing developers to use database specific SQL in their queries. To this end, multiple SQL queries—one for each target type of database—may be associated with the same finder. The target database type, and therefore the specific SQL query that is to be used, is determined dynamically using a deployment descriptor when the EJB Finder is deployed.

In one embodiment, an EJB Finder implemented using SQL may utilize an SQL query that only loads primary key fields, if so desired by the user, by setting the "finders-load-bean" element in the deployment descriptor. When the element is set to false, the SQL query will execute against a particular database and ignore none primary key columns if they are specified in the query.

In one embodiment, an EJB Finder implemented using SQL requires the implementation of a piece of Java® code in addition to the deployment descriptor. The following Java® code can be implemented to deploy a dynamic EJB Finder using SQL language:

```
QueryHome qh = (QueryHome)home;
Query q = qh.createQuery( );
q.setSqlCaching("AllOrderColumns");
Collection c = q.find("select name, street, city, zip from
custTable where o.date='01-Dec-2003'");
```

In this scenario, the string argument passed to Query.find( ) is an SQL query. Calling the QueryProperties.setSqlCaching( ) method indicates that SQL is being used instead of EJB-QL. A method QueryHome.getDatabaseType( ) can also be added that returns the specific type (Oracle, DB2, etc.) of the database to which the SQL is connected. The application can then use this method to create a database specific SQL.

In some embodiments, an EJB Finder implemented using SQL is specified in the deployment descriptor of an EJB, as in the case of EJB-QL. The basic mapping information that users specify in the deployment descriptor will not change when they begin using some of their queries. For example, columns in a table in a database will still be mapped to fields in an EJB. Once users have done this, they are able to use EJB-QL queries without specifying any additional mapping information, and the EJB QL queries are automatically translated using the mapping information that was supplied. When they start using SQL directly, however, some additional mapping information is needed.

In some embodiments, the SQL selection information, e.g., an SQL statement, for both SQL queries and the stored procedures is specified in, e.g., a "sql" element in the "weblogic-rdbms-bean" element in the deployment descriptor of the EJB, such as "weblogic-cmp-jar.xml". Selection information is specified at the bean level so that it may be reused in case there are multiple finders in the EJB that can reuse the same selection information.

In some embodiments, the deployment descriptor "weblogic-cmp-jar.xml" needs to be updated by adding a sub-element, e.g., "sql-caching", to the "weblogic-rdbms-bean" element of "weblogic-cmp-jar.xml" to represent a single entity bean. An exemplary syntax of the updated "weblogic-rdbms-bean" element is as follows:

```
<!ELEMENT weblogic-rdbms-bean (
    ejb-name,
    data-source-name,
```

```
    table-map+,
    field-group*,
    relationship-caching*,
    sql-caching*.
    weblogic-query*,
    delay-database-insert-until?,
    use-select-for-update?,
    lock-order?,
    instance-lock-order?,
    automatic-key-generation?,
    check-exists-on-method?
)>
```

The "sql-caching" element is used to describe the format of the result set that is returned by an SQL query used to implement an EJB finder. An exemplary syntax of the "sql-caching" element is shown as follows:

```
<!ELEMENT sql-caching (
    description?,
    sql-caching-name,
    (ejb | result-column)+
)>
```

An element "sql-caching-name" that uniquely identifies a "sql-caching" element is associated with the formatting description so that the description can be specified once and reused when multiple SQL queries return data entities that map to the same EJB. An exemplary syntax of the "sql-caching-name" element is shown as follows:

<!ELEMENT sql-caching-name (#PCDATA)>

A matched data entity may contain contiguous sequences of columns that are mapped to an EJB, intermixed with columns that are not mapped to an EJB, like an aggregate column. A "result-column" element can be used to term columns that are not mapped to an EJB and are passed through the result set to the user. It designates a column that is not mapped to an EJB, but instead appears as-is in the result set returned to the EJB client code. An exemplary syntax of "result-column" element looks as the following:

<!ELEMENT result-column EMPTY>

An "ejb" element describes a contiguous set of columns in a result set that is mapped to an EJB and optionally related EJBs. An exemplary syntax of the "ejb" element is shown as follows:

```
<!ELEMENT ejb (
    ejb-name,
    table+,
    sql-caching-element*
)>
```

The "table" element within the "ejb" element groups together a set of columns from a particular table. An exemplary syntax of the "table" element is shown as follows:

```
<!ELEMENT table (
    table-name,
    dbms-column+
)>
```

A "sql-caching-element" element within the "ejb" element is used to provide relationship caching functionality for SQL queries by mapping table columns to a related bean(s). An exemplary syntax of the "sql-caching-element" element is shown as follows:

```
<[ELEMENT sql-caching-element (
    cmr-field,
    table+,
    sql-caching-element*
)>
```

In some embodiments, the "weblogic-query" element within the "weblogic-rdbms-bean" element of the deployment descriptor may also need to be modified in addition to the "sql-caching" element. Two new elements are added in the "weblogic query" element: an "ejb-ql-descriptor" and a "sql-descriptor", to support the implementation of an EJB Finder using EJB-QL and SQL language, respectively. An exemplary syntax of the modified "weblogic-query" element is shown as follows:

```
<!ELEMENT weblogic-query (
    description?,
    query-method,
    (ejb-ql-descriptor | sql-descriptor)
    max-elements?,
    include-updates?,
    sql-select-distinct?
)>
```

The "ejb-ql-descriptor" element within the "weblogic-query" element is used when an EJB finder is implemented using the EJB-QL language. An exemplary syntax of the "ejb-ql-descriptor" element is shown as follows:

```
<!ELEMENT ejb-ql-descriptor (
    weblogic-ql?,
    group-name?,
    caching-name?,
)>
```

The "sql-descriptor" element within the "weblogic-query" element is used when an EJB finder is implemented using the SQL language. It associates the WHERE clause of the query with the SELECT and FROM clauses. An exemplary syntax of the "sql-descriptor" element is shown as follows:

```
<!ELEMENT sql-descriptor (
    sql-caching-name,
    (database-type?, sql)+
)>
```

The following exemplary scenarios illustrate how EJB Finder(s) using SQL can be defined and deployed via the EJB's deployment descriptor(s) described in XML (Java® annotations can also be used in a similar fashion). It is assumed in the following exemplary scenarios that an OrderEJB has a 1-N relationship with LineItemEJB, and LineItemEJB in turn has an N-1 relationship with ProductEJB. Although they depict sets of codes for purposes of illustration, the EJB Finder is not limited to any particular code or arrangement of implementation. One skilled in the art will appreciate that the various composition of codes portrayed in the following could be omitted, rearranged, combined and/or adapted in various ways.

In one embodiment, Scenario One utilizes EJB Finders to find all orders placed on a particular date and with a particular status, respectively. Two EJB Finders 301 and 302 are defined for OrderEJB in a deployment descriptor, e.g., ejb-jar.xml, as shown in the exemplary code in FIG. 3(*a*). The "ejb-ql" elements 303 and 304 in both finders are left blank to signify that the queries are not implemented using EJB-QL.

Figure 3:
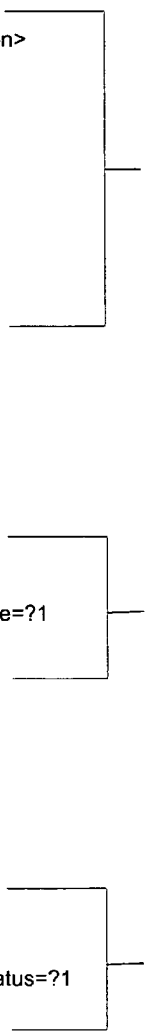
FIG. 3(a)-(b) is an exemplary code illustrating one scenario of implementing an EJB Finder using SQL in accordance with one embodiment of the present invention.

A "sql-caching" element 305 is added in the "weblogic-rdbms-bean" element of a deployment descriptor, "weblogic-cmp-jar.xml", as shown in the exemplary code in FIG. 3(*b*). The "sql-caching" element maps all columns in an "orders" table in the underlying database to OrderEJB. Notice that the same result set description defined by the "sql-caching" element is reused for the two subsequent different finder queries, and it could be reused for any number of queries in reality. Two "sql-descriptor" elements 306 and 307 are added in the "weblogic-query" element to implement the EJB Finder using SQLs instead of EJB-QLS. Since no vendor specific SQL is used for both finders, the same SQL queries can be used regardless of the types of databases the application is deployed against.

In one embodiment, Scenario Two enhances the "findOrdersByDate" finder to load the related OrderLineEJBs as well, which also requires that vendor specific SQL be used for an outer join. The same "ejb-jar.xml" as Scenario One is used to implement the EJB Finders using SQL. A "sql-caching-element" 401 is defined in the "sql-caching" element in the deployment descriptor "weblogic-cmp-jar.xml", as shown in the exemplary code in FIG. 4. The "sql-caching-element" specifies relationship caching by mapping columns in the table of "lineItems" in the database to OrderLineEJBs. The selection information can again be reused by any number of queries, although for brevity, reuse is not shown in this Scenario. Notice that two SQL queries are specified in the "sql-descriptor" element in the "weblogic-query" element, targeting different types of underlying databases. One version of the query 403 is specified for Oracle Database, which relies on Oracle-specific syntax; Another version 402 is specified for every other type of database, which uses the standard SQL syntax for an outer join.

In one embodiment, Scenario Three illustrates the use of a stored procedure 501 to implement the "findOrdersByDate" finder, as shown in the exemplary code in FIG. 5. The ejb-jar.xml contents are the same as in Scenario One. The stored procedure selects all columns from the "order" table, and returns a result set that contains EJB instances of data entities in the "order" table that match the specified date. Although this scenario does not do any pre-fetching of related LineItemEJBs, such function is supported when using a stored procedure.

In one embodiment, Scenario Four illustrates an SQL query used by an EJB Finder that selects all orders and their totals when a total is larger than a specified amount and orders the totals from the largest to the smallest. The descriptor ejb-jar.xml is shown in FIG. 6(*a*).

Figure 6:
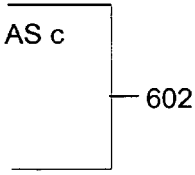
FIGS. 6(a)-(b) is an exemplary code illustrating one scenario of implementing an EJB Finder using SQL in accordance with one embodiment of the present invention.

The "sql-caching" element in the descriptor "web-logic-rdbms-jar" is shown in the exemplary code in FIG. 6(*b*). The SQL 602 is used to implement the EJB Finder in this scenario. Notice that columns that are not mapped to an EJB are handled by the result-column element 601. Also, it is not possible to perform relationship caching for Order in this scenario. This same restriction with respect to relationship caching exists as well if EJB-QL is used.

One embodiment may be implemented using a conventional general purpose or a specialized digital computer or microprocessor(s) programmed according to the teachings of the present disclosure, as will be apparent to those skilled in the computer art. Appropriate software coding can readily be prepared by skilled programmers based on the teachings of the present disclosure, as will be apparent to those skilled in the software art. The invention may also be implemented by the preparation of integrated circuits or by interconnecting an appropriate network of conventional component circuits, as will be readily apparent to those skilled in the art.

One embodiment includes a computer program product which is a machine readable medium (media) having instructions stored thereon/in which can be used to program one or more computing devices to perform any of the features presented herein. The machine readable medium can include, one or more types of disks including floppy disks, optical discs, DVD, CO-ROMs, micro drive, and magneto-optical disks, ROMs, RAMs, EPROMs, EEPROMs, DRAMs, VRAMs, flash memory devices, magnetic or optical cards, nanosystems (including molecular memory ICs), or any type of media or device suitable for storing instructions and/or data.

Stored on any one of the computer readable medium (media), the present invention includes software for controlling both the hardware of the general purpose/specialized computer or microprocessor, and for enabling the computer or microprocessor to interact with a human user or other mechanism utilizing the results of the present invention. Such software may include, but is not limited to, device drivers, operating systems, execution environments/containers, and applications.

The foregoing description of the preferred embodiments of the present invention has been provided for the purposes of illustration and description. It is not intended to be exhaustive or to limit the invention to the precise forms disclosed. Many modifications and variations will be apparent to the practitioner skilled in the art. Particularly, while the concept "bean" is used in the embodiments of the systems and methods described above, it will be evident that such concept can be interchangeably used with equivalent concepts such as, method, class, interface, component, object model, and other suitable concepts. While the concept "instance" is used in the embodiments of the systems and methods described above, it will be evident that such concept can be interchangeably used with equivalent concepts such as, object, and other suitable concepts. Embodiments were chosen and described in order to best describe the principles of the invention and its practical application, thereby enabling others skilled in the art to understand the invention, the various embodiments and with various modifications that are suited to the particular use contemplated. It is intended that the scope of the invention be defined by the following claims and their equivalents.

What is claimed is:

1. A computer implemented system to support querying of a software object, comprising:
   at least one processor;
   a software object finder, which runs on the at least one processor, to perform the steps of:
      querying a plurality of databases using a plurality of queries in different query languages, wherein at least one database in the plurality of databases is associated with a different query language from another database in the plurality of databases;

mapping a matched data entity from the plurality of databases to one or more instances of the software object;

performing relationship caching of one or more additional software objects from the plurality of databases into a cache using queries in different query languages, wherein the one or more additional software objects are related to the software object by one or more predefined relationships, wherein the relationship caching allows the one or more additional software objects to be loaded into the cache in a join query prior to the mapping step, and wherein both the software object and the one or more additional software objects are created and managed by a container and run as part of an application server to support software applications, wherein the software object and the related software objects use one or more deployment descriptors at deploy time, wherein the one or more deployment descriptors allow an editing of structural information about the software object and the one or more additional software objects; and storing the one or more instances of the software object in a result set;

and wherein the one or more deployment descriptors of the software object define:

the different query languages used by the software object finder; and selection information of the different query languages.

2. The system according to claim 1, wherein:
the software object is an entity bean.

3. The system according to claim 1, wherein:
the database is a relational database.

4. The system according to claim 1, wherein:
a query language in the different query languages can be one of: an EJB-QL, an SQL, or a stored procedure.

5. The system according to claim 1, wherein:
a query language in the different query languages can be a standard query language, or a database specific query language.

6. The system according to claim 1, wherein:
the software object finder maps primary key of the data entity only.

7. The system according to claim 1, wherein:
the software object finder further performs at least one of:
leaving one or more columns in the data entity unmapped to the one or more instances of the software object;
marking the one or more columns as "as-is"; and
passing the one or more columns to an object-oriented programming language code.

8. The system according to claim 1, wherein:
one or more features defined by the deployment descriptor is in XML format or an object-oriented programming language annotation.

9. The system according to claim 1, wherein:
a feature in one or more features defined by the one or more deployment descriptors is defined at the software object level and shared by more than one software object finders.

10. The system according to claim 1, wherein:
a feature in one or more features defined by the one or more deployment descriptors is one of:
query statement of the different query languages;
one or more columns in the data entity that are mapped to the one or more instances of the software object; and
one or more columns in the data entity that are not mapped to the one or more instances of the software object.

11. A computer-enabled method to support querying of a software object, comprising:
defining the following properties for a software object finder via a deployment descriptor:
different query languages used by the software object finder; and
selection information of the different query languages; and
performing the following operations via the software object finder:
querying a plurality of databases using a plurality of queries in different query languages, wherein at least one database in the plurality of databases is associated with a different query language from another database in the plurality of databases;
mapping a matched data entity from the plurality of databases to one or more instances of the software object;
performing relationship caching of one or more additional software objects from the plurality of databases into a cache using queries in different query languages, wherein the one or more additional software objects are related to the software object by one or more predefined relationships, wherein the relationship caching allows the one or more additional software objects to be loaded into the cache in a join query prior to the mapping step, and wherein both the software object and the one or more additional software objects are created and managed by a container and run as part of an application server to support software applications, wherein the software object and the related software objects use one or more deployment descriptors at deploy time, wherein the one or more deployment descriptors allow an editing of structural information about the software object and the one or more additional software objects; and
storing the one or more instances of the software object in a result set.

12. The method according to claim 11, wherein:
the software object is an entity bean.

13. The method according to claim 11, wherein:
the database is a relational database.

14. The method according to claim 11, wherein:
a query language in the different query languages can be one of: an EJB-QL, an SQL, or a stored procedure.

15. The method according to claim 11, wherein:
a query language in the different query languages can be a standard query language, or a database specific query language.

16. The method according to claim 11, wherein:
the step of mapping the matched data entity to the one or more instances of the software object maps primary key of the data entity only.

17. The method according to claim 11, further comprising at least one of:
leaving one or more columns in the data entity unmapped to the one or more instances of the software object;
marking the one or more columns as "as-is"; and
passing the one or more columns to an object-oriented programming language code.

18. The method according to claim 11, further comprising:
defining one or more features in the deployment descriptor in XML format or an object-oriented programming language annotation.

19. The method according to claim 11, further comprising at least one of:
defining a feature in one or more features in the one or more deployment descriptors at the software object level; and
sharing the feature with more than one software object finders.

20. The method according to claim 11, wherein:
a feature in one or more features is one of:
query statement of the different query languages;
one or more columns in the data entity that are mapped to the one or more instances of the software object; and
one or more columns in the data entity that are not mapped to the one or more instances of the software object.

21. A machine readable storage medium having instructions stored thereon that when executed cause a system to:
define the following properties for a software object finder via a deployment descriptor:
different query languages used by the software object finder; and
selection information of the different query languages; and
perform the following operations via the software object finder:
querying a plurality of databases using a plurality of queries in different query languages, wherein at least one database in the plurality of databases is associated with a different query language from another database in the plurality of databases;
mapping a matched data entity from the plurality of databases to one or more instances of the software object;
performing relationship caching of one or more additional software objects from the plurality of databases into a cache using queries in different query languages, wherein the one or more additional software objects are related to the software object by one or more redefined relationships, wherein the relationship caching allows the one or more additional software objects to be loaded into the cache in a join query prior to the main step, and wherein both the software object and the one or more additional software objects are created and managed by a container and run as part of an application server to support software applications, wherein the software object and the related software objects use one or more deployment descriptors at deploy time, wherein the one or more deployment descriptors allow an editing of structural information about the software object and the one or more additional software objects; and
storing the one or more instances of the software object in a result set.

22. The machine readable storage medium of claim 21, wherein:
the software object is an entity bean.

23. The machine readable storage medium of claim 21, wherein:
the database is a relational database.

24. The machine readable storage medium of claim 21, wherein:
a query language in the different query languages can be one of: an EJB-QL, an SQL, or a stored procedure.

25. The machine readable storage medium of claim 21, wherein:
a query language in the different query languages can be a standard query language, or a database specific query language.

26. The machine readable storage medium of claim 21, wherein:
the step of mapping the matched data entity to the one or more instances of the software object maps primary key of the data entity only.

27. The machine readable storage medium of claim 21, further comprising instructions that when executed cause the system to perform at least one of:
leaving one or more columns in the data entity unmapped to the one or more instances of the software object;
marking the one or more columns as "as-is"; and
passing the one or more columns to an object-oriented programming language code.

28. The machine readable storage medium of claim 21, further comprising instructions that when executed cause the system to:
define one or more features in the deployment descriptor in XML format or an object-oriented programming language annotation.

29. The machine readable storage medium of claim 21, further comprising instructions that when executed cause the system to perform at least one of:
define a feature in one or more features in the one or more deployment descriptors at the software object level; and
share the feature with more than one software object.

30. The machine readable storage medium of claim 21, wherein:
a feature in one or more features is one of:
query statement of the different query languages;
one or more columns in the data entity that are mapped to the one or more instances of the software object; and
one or more columns in the data entity that are not mapped to the one or more instances of the software object.

31. A computer-implemented system to support querying of a software object, comprising:
at least one processor;
means for defining the following properties for a software object finder via a deployment descriptor:
different query languages used by the software object finder; and
selection information of the different query languages; and
means for performing the following operations via the software object finder:
querying a plurality of databases using a plurality of queries in different query languages, wherein at least one database in the plurality of databases is associated with a different query language from another database in the plurality of databases;
mapping in a matched data entity from the plurality of databases to one or more instances of the software object;
performing relationship caching of one or more additional software objects from the plurality of databases into a cache using queries in different query languages, wherein the one or more additional software objects are related to the software object by one or more predefined relationships, wherein the relationship caching allows the one or more additional software objects to be loaded into the cache in a join query prior to the main step, and wherein both the software object and the one or more additional software objects are created and managed by a container and run as part of an application server to support software applications, wherein the software object and the related software objects use one or more deployment descriptors at deploy time, wherein the one or more deployment descriptors allow an editing of structural information about the software object and the one or more additional software objects; and storing the one or more instances of the software object in a result set.

wherein the EJB finder runs on the at least one processor.

* * * * *

UNITED STATES PATENT AND TRADEMARK OFFICE
CERTIFICATE OF CORRECTION

| | | |
|---|---|---|
| PATENT NO. | : 7,702,691 B2 | Page 1 of 1 |
| APPLICATION NO. | : 10/965529 | |
| DATED | : April 20, 2010 | |
| INVENTOR(S) | : Seth White | |

It is certified that error appears in the above-identified patent and that said Letters Patent is hereby corrected as shown below:

On sheet 2 of 8, in Figure 2, line 2, box "201" delete "depoyment" and insert -- deployment --, therefor.

On sheet 2 of 8, in Figure 2, line 1, box "210" delete "cloumns" and insert -- columns --, therefor.

On sheet 2 of 8, in Figure 2, line 2, box "210" delete "entiites" and insert -- entities --, therefor.

In column 7, line 23, delete "QLS." and insert -- QLs. --, therefor.

In column 7, line 44, delete "Another" and insert -- another --, therefor.

In column 8, line 22, delete "CO" and insert -- CD --, therefor.

In column 11, line 43, in claim 21, delete "redefined" and insert -- predefined --, therefor.

In column 11, line 46, in claim 21, delete "main" and insert -- mapping --, therefor.

In column 12, line 57, in claim 31, delete "in a" and insert -- a --, therefor.

In column 12, line 67, in claim 31, delete "main" and insert -- mapping --, therefor.

In column 14, line 4, in claim 31, delete "set." and insert -- set, --, therefor.

Signed and Sealed this
Nineteenth Day of April, 2011

David J. Kappos
*Director of the United States Patent and Trademark Office*